United States Patent [19]

Horn et al.

[11] Patent Number: 5,202,374
[45] Date of Patent: Apr. 13, 1993

[54] TERNARY MIXTURES

[75] Inventors: Klaus Horn, Krefeld; Klaus Kircher, Leverkusen, both of Fed. Rep. of Germany

[73] Assignee: Bayer Aktiengesellschaft, Leverkusen, Fed. Rep. of Germany

[21] Appl. No.: 744,762

[22] Filed: Aug. 14, 1991

[30] Foreign Application Priority Data

Aug. 22, 1990 [DE] Fed. Rep. of Germany ....... 4026475

[51] Int. Cl.$^5$ .................. C08L 69/00; C08L 23/08; C08K 7/14
[52] U.S. Cl. ...................... 524/508; 525/148
[58] Field of Search .............. 524/508; 525/148

[56] References Cited

U.S. PATENT DOCUMENTS 4,420,584 12/1983 Rawlings et al. .............. 524/502
4,970,256 11/1990 Inoue ............................ 525/148
5,070,145 12/1991 Guerdoux ....................... 525/179

FOREIGN PATENT DOCUMENTS 063769 4/1982 European Pat. Off. .
2617176 12/1988 France .
268754 11/1988 Japan .
080135 4/1991 Japan .
8000083 1/1980 World Int. Prop. O. .

OTHER PUBLICATIONS

Patent Abstract of Japan, vol. 12, No. 237, Jul. 6, 1988, & JP A-A-63 027 553 (Nissan Motor Co. Ltd.) Feb. 5, 1988.
Patent Abstracts of Japan, vol. 7, No. 53, Mar. 1983 & JP A 57 200 444 (Idemitsu Sekiyu Kagaku K.K.) Dec. 8, 1982.
World Patents Index Latest Sec. Ch. Wk. 9120, Jul. 17, 1991 Cl A, AN 91-144216 & JP-A-3 080 135 (Nippon Glass Fiber K.K.) Apr. 4, 1991.

Primary Examiner—David J. Buttner
Attorney, Agent, or Firm—Joseph C. Gil; Aron Preis

[57] ABSTRACT

A thermoplastic molding composition containing a ternary mixture of (i) a polycarbonate and/or a polyester carbonate, (ii) glass fibers and (iii) a terpolymer of $C_{2-8}$ olefine/acryllic acid ester/maleic acid anhydride is disclosed. The composition is suitable for molding articles having rigidity and toughness properties. A process for the preparation of the composition is also disclosed.

5 Claims, No Drawings

TERNARY MIXTURES

The present invention relates to ternary mixtures containing
- A) from 49.9 to 96.9% by weight, preferably from 59.9 to 96.9% by weight, in particular from 79.6 to 94.9% by weight, of thermoplastic, aromatic polycarbonates and/or thermoplastic, aromatic polyester carbonates,
- B) from 3 to 50% by weight, preferably from 3 to 40% by weight, in particular from 5 to 20% by weight, of glass fibres and
- C) from 0.1 to 10% by weight, preferably from 0.1 to 5% by weight, in particular from 0.4 to 3% by weight, of $C_2$–$C_8$ olefin/acrylic acid ester/maleic acid anhydride terpolymers, the percentages by weight of components A)+B)+C) adding up to 100% by weight.

Polycarbonates containing glass fibres and an addition of polyanhydride resins are known (see U.S. Pat. No. 4,420,584 and EP-B1-0 063 769). These moulding compounds have improved impact strength and greater elongation at break but in the hot air ageing test these polycarbonate moulding compounds undergo severe discolouration which is accompanied by a molecular degradation of the polycarbonate matrix.

The mixtures according to the invention, by contrast, not only have high impact strength but are also stable in colour after hot air ageing. The Components Polycarbonate component A) is both a homocopolycarbonate and a copolycarbonate, and mixtures of polycarbonates with homopolycarbonates as well as with copolycarbonates are also suitable.

The polycarbonates used as component A) should have weight average molecular weights $M_w$ (determined in known manner, for example from the relative solution viscosity or by gel chromatography after calibration) of from 10,000 to 200,000, preferably from 20,000 to 80,000.

The polycarbonates constituting component A) are based on diphenols corresponding to formula a)

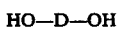

HO—D—OH        a)

wherein D is a double bonded aromatic group having 6 to 50 carbon atoms, in particular 12 to 45 carbon atoms and optionally still containing hetero atoms or carbon-containing hetero segments, which are not included in the 6 to 50 carbon atoms.

The polycarbonates thus have bifunctional structural units corresponding to formula b)

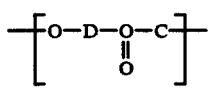

b)

wherein D has the meaning indicated above.

The polycarbonates constituting component A) may also be branched in known manner (see, for example, DE-PS 2 500 092 and U.S. Pat. No. 4,185,009) by the incorporation of small quantities, preferably from 0.05 to 2 mol-%, based on the diphenols used, of trifunctional or higher than trifunctional compounds, e.g. compounds having three or more than three OH groups.

The following are some examples of suitable compounds having three or more than three phenolic hydroxyl groups: Phloroglucinol, 4,6-dimethyl-2,4,6-tri-(4-hydroxyphenyl)-heptane, 1,3,5-tri-(4-hydroxyphenol)-benzene, 1,1,1-tri-(4-hydroxyphenyl)-ethane, 2,6-bis-(2'-hydroxy-5'-methyl-benzyl)-4-methylphenol, 2-(4-hydroxyphenyl)-2-(2,4-dihydroxyphenyl)-propane and 1,4-bis-(4,4'-dihydroxy-triphenyl-methyl)-benzene.

2,4-Dihydroxybenzoic acid, trimesic acid, cyanuric chloride and 3,3-bis-(4-hydroxy-3-methyl-phenyl)-2-oxo-2,3-dihydroindole are further examples of trifunctional compounds.

Examples of suitable diphenols corresponding to formula a) include diphenols of formula a)1)

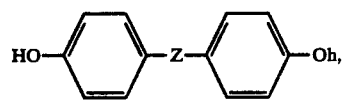

a)1)

wherein Z denotes a single bond, an alkylene group having 1 to 8 carbon atoms, an alkylidene group having 2 to 12 carbon atoms, a cyclohexylidene group, a benzylidene group, a methylbenzylidene group, a bis-(phenyl)-methylene group, S, $SO_2$, CO or O, and the phenyl nuclei linked through Z may be mono- or disubstituted by methyl, bromine or chlorine.

Suitable diphenols of formula a) also include those of formula a)2)

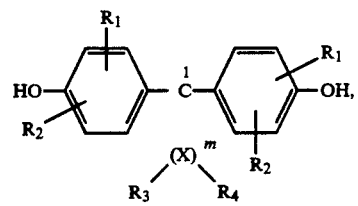

wherein
$R^1$ and $R^2$ denote, independently of one another, hydrogen, halogen, preferably chlorine or bromine, $C_1$–$C_6$-alkyl, $C_5$–$C_6$-cycloalkyl, $C_6$–$C_{10}$-aryl, preferably phenyl, and $C_7$–$C_{12}$-alkyl, preferably phenyl-$C_1$–$C_4$-alkyl, in particular benzyl, m stands for an integer with a value from 4 to 7, preferably 4 or 5, $R_3$ and $R_4$, which are chosen individually for each X, denote, independently of one another, hydrogen or $C_1$–$C_6$-alkyl, and X stands for carbon, under the condition that $R_3$ and $R_4$ both denote alkyl on at least one X atom.

$R_3$ and $R_4$ are thus both alkyl on 1 or 2 X atoms, preferably on only one X atom. The preferred alkyl group is methyl. The X atoms in the α-position to the diphenyl-substituted carbon atom (C-1) are preferably not dialkyl-substituted but alkyl disubstitution is preferred in the β-position to C-1.

In this context, dihydroxydiphenyl cycloalkanes having 5 or 6 ring carbon atoms in the cycloaliphatic group (m=4 or 5 in formula a)2)) are preferred, e.g. the diphenols corresponding to the following formulae:

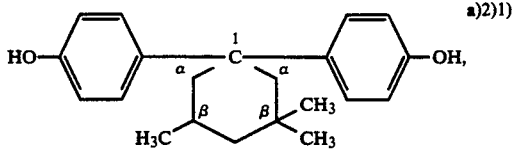

a)2)1)

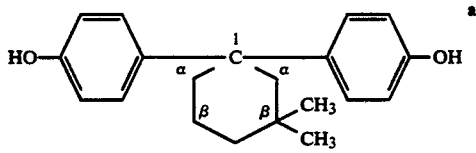

a)2)2)

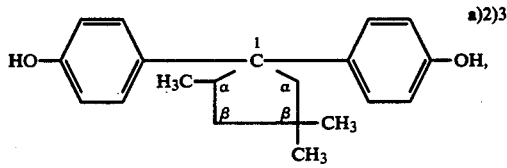

a)2)3)

1,1-bis-(4-hydroxyphenyl)-3,3,5-trimethylcyclohexane, (formula a)2)1)) being particularly preferred.

The diphenols corresponding to formula a)2), their preparation and their use for the preparation of homopolycarbonates, and copolycarbonates, optionally in combination with other diphenols, is the subject of German Offenlegungsschrift 3 832 396 (Le A 26 344).

The preparation of the other polycarbonates used as component A), e.g. polycarbonates of diphenols of formula a)1), is also known from the literature (see, for example, H. Schnell, Chemistry and Physics of Polycarbonates, Interscience Publishers, New York, 1964 or U.S. Pat. Nos. 3,028,365 and 3,275,601).

The following are examples of diphenols corresponding to formula a):
Hydroquinone,
resorcinol,
dihydroxydiphenyls,
bis-(hydroxyphenyl)-alkanes,
bis-(hydroxyphenyl)-cycloalkanes,
bis-(hydroxphenyl)-sulphides,
bis-(hydroxyphenyl)-ethers,
bis-(hydroxphenyl)-ketones,
bis-(hydroxyphenyl)-sulphones,
bis-(hydroxphenyl)-sulphoxides,
α,α'-bis-(hydroxyphenyl)-diisopropylbenzenes
and corresponding compounds alkylated or halogenated in the nucleus.

These and other suitable diphenols of formula a) are described, for example, in U.S. Pat. Nos. 3,028,365, 2,999,835, 3,148,182, 3,275,601, 2,991,273, 3,271,367, 3,062,781, 2,970,131 and 2,999,846, in German Offenlegungsschriften 1 570 703, 2 063 050, 2 063 052 and 2 211 095, in French Patent Specification 1 561 518 and in the monograph by H. Schnell, "Chemistry and Physics of Polycarbonates," Interscience Publishers, New York, 1964.

The following are examples of preferred diphenols of formula a):
4,4'-Dihydroxydiphenyl,
2,2-bis-(4-hydroxyphenyl)-propane,
2,4-bis-(4-hydroxyphenyl)-2-methylbutane,
1,1-bis-(4-hydroxyphenyl)-cyclohexane,
α,α'-bis-(4-hydroxyphenyl)-p-diisopropylbenzene,
2,2-bis-(3-methyl-4-hydroxyphenyl)-propane,
2,2-bis-(3-chloro-4-hydroxphenyl)-propane,
bis-(3,5-dimethyl-4-hydroxyphenyl)-methane,
2,2-bis-(3,5-dimethyl-4-hydroxyphenyl)-2-methylbutane,
1,1-bis-(3,5-dimethyl-4-hydroxyphenyl)-cyclohexane,
α,α'-bis-(3,5-dimethyl-4-hydroxyphenyl)-p-diisopropylbenzene,
2,2-bis-(3,5-dichloro-4-hydroxyphenyl)-propane,
2,2-bis-(3,5-dibromo-4-hydroxyphenyl)-propane
and the diphenols a)2)1), a)2)2) and a)2)3).

The following are examples of particularly preferred diphenols of formula a):
2,2-Bis-(4-hydroxyphenyl)-propane,
2,2-bis-(3,5-dimethyl-4-hydroxyphenyl)-propane,
2,2-bis-(3,5-dichloro-4-hydroxyphenyl)-propane,
2,2-bis-(3,5-dibromo-4-hydroxyphenyl)-propane,
1,1-bis-(4-hydroxyphenyl)-cyclohexane and
1,1-bis-(4-hydroxyphenyl)-3,3,5-trimethylcyclohexane of formula a)2)1).

2,2-Bis-(4-hydroxyphenyl)-propane and 1,1-bis-(4-hydroxyphenyl)-3,3,5-trimethylcyclohexane are particularly preferred.

The diphenols of formula a) may be used either singly or as a mixture.

The molecular weights may be regulated in known manner by means of monofunctional compounds used as chain terminators at the usual concentrations. Examples of suitable compounds include phenol, tert.-butyl-phenols and other alkyl-$C_1$-$C_7$-substituted phenols.

Small quantities of phenols of formula c)

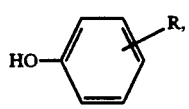

c)

in which R stands for a branched $C_8$- and/or $C_9$-alkyl group are particularly suitable for regulating the molecular weight.

The proportion of $CH_3$ protons in the alkyl group R is preferably from 47 to 89% and the proportion of CH and $CH_2$ protons is preferably from 53 to 11%. R in the o-and/or p-position to the OH group is also preferred, and the upper limit of the ortho-component of 20% is particularly preferred. The chain terminators are generally used in quantities of from 0.5 to 10 mol-%, preferably from 1.5 to 8 mol-%, based on the diphenols used.

Thermoplastic aromatic polyestercarbonates used as component A) in the present invention are those obtainable in known manner from diphenols, phosgene, aromatic dicarboxylic acid dichlorides, chain terminators and optionally branching agents. Suitable diphenols are those corresponding to formula a) already mentioned for the preparation of the polycarbonates.

Suitable chain terminators are, for example, monophenols, which are also suitable for the preparation of polycarbonates.

The trifunctional and higher than trifunctional compounds mentioned above for the preparation of polycarbonates may suitably be used as branching agents. These include not only phenolic compounds but also aromatic tricarboxylic acid chlorides and aromatic tetracarboxylic acid chlorides and acid chlorides of aromatic carboxylic acids of even higher valency. They are used in quantities of from 0.01 to 1 mol-%, which quantities are based on the aromatic dicarboxylic acid dichlorides put into the process whereas the 0.01 to 1 mol-% of phenolic branching agents used is based on the diphenols used for the preparation of the aromatic polyester carbonate.

Suitable aromatic dicarboxylic acid dichlorides are: Terephthalic acid dichloride, isophthalic acid dichloride, o-phthalic acid dichloride, diphenyldicarboxylic acid dichloride, naphthalene dicarboxylic acid dichloride and mixtures thereof.

Preferred mixtures are those of terephthalic acid dichlorides and isophthalic acid dichlorides used in ratios of from 20:1 to 1:20, in particular from 7:3 to 3:7.

The aromatic polyester carbonates used in the present invention contain up to about 80 mol-%, preferably up to about 50 mol-%, of carbonate groups, based on the molar sum of carbonate groups and aromatic carboxylic acid ester groups.

Both the ester component and the carbonate component of the aromatic polyester carbonates according to the invention may be distributed in the polycondensate in the form of blocks or at random.

The relative solution viscosity ($\eta_{rel}$) of the aromatic polyester carbonates is in the range of from 1.18 to 1.4, preferably from 1.22 to 1.3 (determined on solutions of 0.5 g of polyester carbonate in 100 ml of $CH_2Cl_2$ solution at 25° C.).

The polyester carbonate component A) may include both a homopolyester carbonate and a polyester carbonate based on several diphenols as well as a polyester carbonate based on only one aromatic dicarboxylic acid or based on several dicarboxylic acids. The polyester carbonates of component A) and their preparation are known (see, for example, EP-OS 0 036 080 (Le A 20 203), DE-OS 3 007 934 (Le A 20 203), U.S. Pat. No. 3,169,121 and German Patent Application P 3 903 103.9 (Le A 26 313) for the polyester carbonates obtained from diphenols of formula a)2)).

The glass fibres used for the moulding compounds of the present invention may be any commercially obtainable types of glass fibres, i.e. chopped strands of glass fibres (long glass fibres), provided they have been made compatible with the polycarbonate by means of suitable sizes. The glass fibres used for the preparation of the moulding compounds are produced from E-glass. E-glass as defined by DIN 1259 is an aluminium-boron-silicate glass having an alkali metal oxide content below 1% by weight. The glass fibres used may have a diameter from 8-20 $\mu$m and a length of 3-6 mm (chopped strands). Both sized and unsized short glass may also be used.

Suitable $C_2$–$C_8$-olefins for the preparation of the terpolymers used as component C) according to the invention include, for example, ethylene, propylene, hexene, butadiene, isoprene and chloroprene.

Examples of acrylic acid esters for the preparation of the terpolymers used as component C) according to the invention include esters of acrylic acid with $C_1$–$C_8$-alcohols such as methanol, ethanol, n-butanol and n-octanol.

The following are suitable quantitative proportions used according to the invention for the preparation of the terpolymers:

1) from 40 to 90% by weight of $C_2$–$C_8$-olefins,
2) from 5 to 40% by weight of acrylic acid esters and
3) from 0.1 to 30% by weight, preferably from 0.1 to 20% by weight, most preferably from 1 to 15% by weight, of maleic acid anhydride, the percentages by weight of components 1)+2)+3) always adding up to 100% by weight.

Suitable terpolymers used as component C) according to the invention are rubber-like, i.e. they have elastic properties.

The terpolymers of component C) are either copolymers or graft polymers.

The maleic acid anhydride may be terpolymerised with ethylene and acrylic acid ester in the course of the synthesis or it may be polymerised on a preformed graft basis by a conventional grafting reaction.

The terpolymers according to the invention containing acid anhydride groups may be prepared by any known polymerisation processes (emulsion, solution, solvent-free, suspension and precipitation polymerisation) and combinations of these processes.

For the preparation of the terpolymers containing acid anhydride groups by a grafting reaction, the monomer which is to be grafted is polymerised in the presence of the previously formed graft basis.

In this reaction, free homopolymer is formed in addition to the graft polymer proper. The graft product is therefore always taken to be the sum of the graft copolymers proper and the free polymers. The quantity of monomer grafted and its molecular weight may be influenced within wide limits by varying the polymerisation conditions, especially the nature of the polymerisation process, the temperature, the activator system, the molecular weight regulators, the conditions of stirring and the method of monomer dosing.

Particularly preferred terpolymers are those which are prepared from 1) 40 to 90% by weight of ethylene,
2) 5 to 40% by weight of one or more acrylic acid-$C_1$–$C_8$-alkyl esters and
3) 0.1 to 30% by weight, preferably 0.1 to 20% by weight, most preferably 1 to 15% by weight, of maleic acid anhydride, the percentages by weight of components 1)+2)+3) adding up to 100% by weight.

The terpolymers to be used according to the invention should be substantially uncross-linked, i.e. they should be soluble to an extent of at least 90% in hot solvents, e.g. in toluene, ethyl benzene or tetrachloroethylene. The terpolymers used as component C) have melting points from 40° to 160° C., preferably from 60° to 150° C. The melting points were determined by the DSC method (Differential-Scanning-Calorimeter Method).

The Vicat temperatures of the terpolymers to be used according to the invention are from 30° to 110° C., preferably from 35° to 90° C., determined according to DIN 53 460.

To prepare the mixture according to the invention of components A), B) and C), the polycarbonate is melt compounded with the glass fibres and the terpolymer containing acid anhydride groups at temperatures from 260° C. to 360° C., preferably from 280° C. to 320° C., and the mixture obtained is cooled and granulated in known manner.

Conventional two-shaft extruders suitable for mixing the polycarbonate and glass fibres may be used for preparing the mixtures according to the invention.

The present invention thus also relates to a process for the preparation of the mixtures according to the invention of components A), B) and C), characterised in that the polycarbonate is melt compounded with the glass fibres and the terpolymer containing acid anhydride groups at temperatures from 260° to 360° C., preferably from 280° C. to 320° C. and the mixture obtained is cooled and granulated in known manner.

Conventional additives for components A), B) and C) may be incorporated in the mixtures according to the invention in the usual quantities before or during or after preparation of the mixtures.

The following are suitable additives: Fillers such as, for example, mineral fillers, plasticizers, fluidizing agents, stabilizers against UV light, heat, moisture and the action of $O_2$, pigments and flame-retardants.

The present invention also relates to mixtures consisting of components A), B) and C) according to the invention and at least one additive selected from fillers, plasticizers, fluidizing agents, stabilizers, pigments and flame-retardants.

The present invention also relates to a process for the preparation of the mixtures according to the invention, consisting of the components A), B) and C) according to the invention and at least one additive selected from fillers, plasticizers, fluidizing agents, stabilizers, pigments and flame-retardants, characterised in that at least one of the above-mentioned additives is incorporated in known manner in the quantities conventionally used for components A), B) and C) before or during or after preparation of the mixtures of components A), B) and C) according to the invention.

The mixtures according to the invention may be worked up into various moulded articles in known manner, for example by injecting moulding.

The mixtures according to the invention may be used wherever moulded articles of polycarbonates containing glass fibres having the required rigidity and toughness are used.

EXAMPLES 1-5

I) An aromatic polycarbonate having a relative viscosity $\eta rel = 1.28$ (0.005 g cm$^{-3}$ in methylene chloride, 25° C.) which has been dried at 120° C. for 24 hours is melted at temperatures from 300° C. to 320° C. in a double shaft extruder.

A mixture of glass fibres and a terpolymer containing acid anhydride is then added directly to the polycarbonate melt. The polymer strand is cooled and granulated and worked up into injection moulded products by the conventional techniques for glass fibre reinforced polycarbonates.

II) The glass fibres used in the Examples are polyurethane-sized fibres having a diameter of 14 μm and a length of 3 mm.

III) The terpolymers used in the Examples are prepared by the polymerisation of ethylene butyl acrylate and maleic acid anhydride by a high pressure process, optionally in the presence of suitable catalysts.

| | Composition of the terpolymers used | | |
|---|---|---|---|
| Terpolymer | Ethylene (% by wt.) | Acrylic acid ester (% by wt.) | Maleic acid anhydride (% by wt.) |
| A | 83.5 | 10.0 | 6.5 |
| B | 62.8 | 24.6 | 12.6 |
| C | 55.4 | 32.3 | 12.3 |

| Starting material (% by wt.) | | 1 | 2 | 3 | 4 | 5 Comparison Example | 6 | 7 | 8 | 9 Comparison Example | 10 | 11 | 12 Comparison Example | 13 | 14 | 15 Comparison Example |
|---|---|---|---|---|---|---|---|---|---|---|---|---|---|---|---|---|
| I) Polycarbonate | | 89.5 | 88 | 88 | 88 | 90 | 84 | 83 | 82 | 85 | 84 | 83 | 85 | 77.5 | 77 | 80 |
| II) Glass fibres | | 10 | 10 | 10 | 10 | 10 | 15 | 15 | 15 | 15 | 15 | 15 | 15 | 20 | 20 | 20 |
| III) Terpolymer | A | 0.5 | 2 | — | — | — | 1 | 2 | 3 | — | — | — | — | 2.5 | 3 | — |
| | B | — | — | 2 | — | — | | | | | | | | | | |
| | C | — | — | — | 2 | — | — | — | — | | 1 | 2 | — | — | — | — |

| Example | $\eta rel$ | Impact strength according to DIN 53453 kJ/m$^2$ | Notched impact strength according to DIN 53453 kJ/m$^2$ | E-Modulus Tension test according to DIN 53457 MPa | E-Modulus Bending test according to DIN 53457 MPa | Vicat B 120 Temp. °C. |
|---|---|---|---|---|---|---|
| 1 | 1.285 | 90 | 10 | 4200 | 3855 | 145 |
| 2 | 1.284 | nb | 27 | 4141 | 3900 | 145 |
| 3 | 1.288 | nb | 27 | 4115 | 3860 | 145 |
| 4 | 1.282 | nb | 26 | 4000 | 3822 | 144 |
| 5 | 1.287 | 44 | 8 | 4275 | 3915 | 146 | nb = not broken

| Example | $\eta rel^{1)}$ | Impact strength according to DIN 53453 kJ/m$^2$ | Notched impact strength according to DIN 53453 kJ/m$^2$ | E-Modulus Tension test according to DIN 53457 MPa | E-Modulus Bending test according to DIN 53457 MPa | Vicat B 120 Temp. °C. |
|---|---|---|---|---|---|---|
| 6 | 1.281 | nb | 24 | 4954 | 4614 | 146 |
| 7 | 1.279 | nb | 27 | 4949 | 4664 | 147 |
| 8 | 1.278 | nb | 26 | 4979 | 4672 | 146 |
| 9 | 1.279 | 35 | 10 | 5030 | 4633 | 147 |

[1]) Determined on the test rod
nb = not broken

| Example | $\eta \text{rel}^{1)}$ | Impact strength according to DIN 53453 kJ/m² | Notched impact strength according to DIN 53453 kJ/m² | E-Modulus Tension test according to DIN 53457 MPa | E-Modulus Bending test according to DIN 53457 MPa |
|---|---|---|---|---|---|
| 10 | 1.282 | nb | 15 | 4961 | 4578 |
| 11 | 1.285 | nb | 23 | 4851 | 4565 |
| 12 | 1.280 | 39 | 10 | 5040 | 4571 |
| 13 | — | nb | 24 | 5938 | 5970 |
| 14 | — | nb | 24 | 6020 | 5928 |
| 15 | — | 34 | 13 | 6064 | 5675 | nb = not broken

What is claimed is:

1. A thermoplastic molding composition comprising
(A) about 49.9 to 96.9% of at least one member selected from the group consisting of a thermoplastic aromatic polycarbonate and a thermoplastic aromatic polyester carbonate,
(B) about 5 to 20% of glass fibers, and
(C) about 0.4 to 3% of a C2–C8-olefin/acrylic acid ester/maleic acid anhydride terpolymer, said percentages relating to the weight of said composition.

2. The composition of claim 1 wherein said terpolymer comprise
40 to 90% of ethylene, 5 to 40% of one or more acrylic acid $C_1$–$C_8$-alkyl esters and
0.1 to 30% of maleic acid anhydride,
said percentages being relative to the weight of said (C).

3. The composition of claim 1 further comprising at least one additive selected from the group consisting of a filler, a plasticizer, a fluidizing agent, a stabilizer, a pigment and a flame-retardant.

4. The composition of claim 2 wherein said maleic acid anhydride is present in an amount of 0.1 to 20% by weight.

5. The composition of claim 4 wherein said maleic acid anhydride is present in an amount of 1 to 15% by weight.